(12) United States Patent
Braun et al.

(10) Patent No.: US 10,888,076 B2
(45) Date of Patent: Jan. 12, 2021

(54) FISHING LINE REEL WITH IN-LINE PAYOUT CONTROL

(71) Applicant: AMS, LLC, Stratford, WI (US)

(72) Inventors: Jeff Braun, Stratford, WI (US); Tim Morines, Abbotsford, WI (US)

(73) Assignee: AMS, LLC, Stratford, WI (US)

( * ) Notice: Subject to any disclaimer, the term of this patent is extended or adjusted under 35 U.S.C. 154(b) by 195 days.

(21) Appl. No.: 16/151,445

(22) Filed: Oct. 4, 2018

(65) Prior Publication Data

US 2019/0029241 A1    Jan. 31, 2019

Related U.S. Application Data

(63) Continuation of application No. 15/190,595, filed on Jun. 23, 2016, now Pat. No. 10,091,977, and a continuation-in-part of application No. 15/886,106, filed on Feb. 1, 2018, which is a continuation-in-part of application No. 15/689,105, filed on Aug. 29, 2017, now Pat. No. 10,499,622.

(51) Int. Cl.
| | | |
|---|---|---|
| *A01K 89/06* | (2006.01) | |
| *A01K 89/00* | (2006.01) | |
| *A01K 89/01* | (2006.01) | |
| *A01K 81/00* | (2006.01) | |
| *A01K 89/033* | (2006.01) | |

(52) U.S. Cl.
CPC ............ *A01K 89/006* (2013.01); *A01K 81/00* (2013.01); *A01K 89/0102* (2013.01); *A01K 89/046* (2015.05)

(58) Field of Classification Search
CPC ................ A01K 81/00; A01K 89/0102; A01K 89/0108; A01K 89/081; A01K 89/01087; F41B 5/1488
See application file for complete search history.

(56) References Cited

U.S. PATENT DOCUMENTS

| | | | | | |
|---|---|---|---|---|---|
| 3,129,525 | A | * | 4/1964 | Lewis ..................... | A01K 91/02 43/19 |
| 3,143,823 | A | * | 8/1964 | Brown ................... | A01K 87/00 43/19 |
| 3,377,999 | A | * | 4/1968 | Bennett ................. | F41B 5/1488 124/88 |
| 4,587,943 | A | * | 5/1986 | Ross ........................ | F41B 3/02 124/20.1 |
| 4,674,471 | A | * | 6/1987 | Lance .................... | A01K 81/00 124/86 |
| 4,773,179 | A | * | 9/1988 | Corley ................... | A01K 91/02 124/86 |
| 5,553,413 | A | * | 9/1996 | Gannon ................. | A01K 81/00 43/6 |

(Continued)

*Primary Examiner* — Emmanuel M Marcelo
(74) *Attorney, Agent, or Firm* — Boyle Fredrickson S.C.

(57) ABSTRACT

A reel for fishing line or the like provides for extremely rapid payout by releasing the line to unwind by sliding rapidly around a guide surrounding the line spool and by rotation of the line spool itself. A handle extending rearwardly from the reel controls a line guide preventing sliding of the fishing line around the guide and providing controllable friction and locking of rotation of the line spool only when actuated by the user to permit retraction of the line or controlled tensioning of the line.

14 Claims, 7 Drawing Sheets

(56) References Cited

U.S. PATENT DOCUMENTS

| | | | | |
|---|---|---|---|---|
| 5,911,216 A * | 6/1999 | Killian | F41B 5/066 124/86 |
| 5,983,881 A * | 11/1999 | Killian | F41B 5/066 124/86 |
| 6,055,764 A * | 5/2000 | Armanno, Sr. | F41B 5/0005 43/19 |
| 7,594,352 B2 | 9/2009 | Holmberg | |
| 8,024,884 B2 | 9/2011 | Holmberg | |
| 8,567,382 B2 | 10/2013 | Kingsbury et al. | |
| 8,839,776 B2 | 9/2014 | Kingsbury et al. | |
| D746,397 S | 12/2015 | Kingsbury | |
| 9,383,160 B1 * | 7/2016 | White | A01K 89/006 |
| 2011/0240811 A1 * | 10/2011 | Soderberg | F41B 5/14 248/222.14 |
| 2012/0042863 A1 * | 2/2012 | Smith | F41G 1/467 124/87 |
| 2013/0139733 A1 * | 6/2013 | Daniel, IV | A47B 13/003 108/26 |
| 2014/0332615 A1 * | 11/2014 | Braun | A01K 89/0102 242/236 |
| 2015/0024880 A1 * | 1/2015 | Pedersen | F41B 5/1484 473/575 |
| 2015/0053195 A1 * | 2/2015 | Soderberg | F41B 5/14 124/88 |
| 2015/0157001 A1 * | 6/2015 | Mayer | F42B 6/02 43/4.5 |
| 2015/0264907 A1 * | 9/2015 | Dunlop | A01K 89/01084 124/23.1 |
| 2015/0354915 A1 * | 12/2015 | Woods, Jr. | F41B 5/1488 124/86 |
| 2017/0295768 A1 * | 10/2017 | Noble | F41B 5/1488 |

* cited by examiner

FISHING LINE REEL WITH IN-LINE PAYOUT CONTROL

CROSS REFERENCE TO RELATED APPLICATIONS

This application is a continuation of U.S. application Ser. No. 15/190,595, filed Jun. 23, 2016, and is also a continuation-in-part application of U.S. application Ser. No. 15/886,106, filed Feb. 1, 2018, which is a continuation-in-part application of U.S. application Ser. No. 15/689,105, filed Aug. 29, 2017, all of which are hereby incorporated by reference in their entireties.

BACKGROUND OF THE INVENTION

The present invention relates to a reel for winding and storing fishing line or the like and more particularly to a reel that provides rapid payout of the fishing line, for example, as required when the reel is used for bow fishing.

In bow fishing, an arrow is fitted with a lightweight but sturdy line which may pay out behind the arrow when the arrow is shot from a bow. The line allows the arrow, and/or arrow and fish, to be retrieved after the shot.

It is important that the line be stored without tangling before release of the arrow and yet be able to pay out rapidly with little resistance when the arrow is released. Conventional reels which rotate to wind or unwind line present substantial rotational inertia that can interfere with free flight of the arrow.

These problems of line storage and release are addressed in a novel bow fishing reel described in U.S. Pat. No. 4,383,516, assigned to the assignee of the present invention, in which the line is loosely coiled in a bottle. After the line is pulled from the bottle by the arrow, opposed rubber rollers at the mouth of the bottle clamp together about the line and push it into the bottle under the urging of a geared crank handle. The line is stored without winding in a loose mass within the bottle that nevertheless resists tangling.

An alternative to the above design can be found in conventional spin casting reels, which are sometimes used for bow fishing, for example, the type described in U.S. Pat. No. 6,375,107, in which the axis of the spool about which the line is wound is parallel to the direction that the line pays out after arrow release. As the line pays out, the line slips over the edge of the reel unwinding without rotation of the reel or the need to overcome a corresponding rotational inertia of the reel. The line is returned to the reel by a bail arm or similar device orbiting the reel as driven by a crank arm. The bail arm catches the line to wrap it around the reel without reel rotation. Such spin casting reels may be attached to cantilevered arms extending forward from the bow riser. Before drawing the bow and releasing the arrow, the user uses his or her free hand to press a thumb button on the rear of the reel to release the bail arm or fold the bail arm back.

Co-pending U.S. application Ser. No. 14/270,817, entitled Fishing Line Reel with Rapid Line Payout, assigned to the assignee of the present invention, describes a bow fishing reel in which spooling line back on the reel may be initiated by a trigger lever spring biased to the line-releasing state but readily actuated by fingers of the same hand supporting the bow. Motion of the handle may smoothly vary the amount of resistance to the line unspooling or may lock the line spool against rotation.

SUMMARY OF THE INVENTION

The present invention provides a fishing line reel with many of the benefits described in the co-pending application discussed above but that provides an in-line payout control handle that may be positioned near the user's hand holding the bow for simple direct control of payout tension using the fingers of the bow-holding hand. The in-line payout control handle provides improved alignment of the reel force with the user's hand and provides nuanced control possible with direct mechanical linkage. A mounting system with multiple adjustment dimensions allows the reel to be supported on mounting bar that can be attached to attachment features found in many bows.

Specifically then, the present invention in one embodiment provides a fishing line reel providing rapid line payout having a housing supporting a crank mechanism operable by a user for rotating a first shaft extending along an axis with respect to the housing. A line spool may also be supported by the housing rotatable about the first shaft and a winder may be attached to rotate with the first shaft. The winder provides a line guide for catching a fishing line so that the fishing line winds about the line spool with rotation of the first shaft when the line guide is in an extended position and for freeing the fishing line so that the fishing line does not wind about the line spool with the rotation of the first shaft when the line guide is in a retracted position. A handle extends from a rear of the housing substantially along the axis and is operable by the user to move the line guide from the retracted position to the extended position when the handle moves between a released position and an actuated position. A bias spring biases the handle mechanism to move the line guide to the released position.

It is thus a feature of at least one embodiment of the invention to provide a reel design that may be better aligned with the user's normal grip on a bow so as to minimize torsion on the bow when the line is under tension from the fish. The handle allows a single line of force to connect tension on the fishing line with force on the handle through the user's hand to the bow support region.

The handle may be a T-handle attached to a second shaft extending substantially along the axis and providing finger grip portions extending in opposite directions perpendicularly to the axis.

It is thus a feature of at least one embodiment of the invention to provide a handle that centers the user's force on the shaft for reduced binding and torsion.

The finger grip portions are generally arcuate on a surface toward the housing.

It is thus a feature of at least one embodiment of the invention to provide a handle design that properly centers the user's fingers about the shaft.

The second shaft of the T-handle may be coaxial with the first shaft of the winder.

It is thus a feature of at least one embodiment of the invention to provide an extremely compact activation mechanism in which the actuation shaft and crankshaft may be perfectly aligned.

The reel may include a mounting assembly for attaching the housing to a bow, the mounting assembly including clamping elements in a released state allowing rotation of the mounting element around an axis of rotation parallel to the axis.

It is thus a feature of at least one embodiment of the invention to provide a mounting system that may work with common mounting points on a bow used for bow stabilizers or the like.

The mounting assembly may provide an axial bore receiving a bar that may attach to the bow to extend from the bow generally parallel to the axis so that the mounting assembly when the clamping elements are released may rotate about the bar.

It is thus a feature of at least one embodiment of the invention to permit rotational adjustment of the reel for better alignment of the handle and fishing line with the user's grip.

The mounting assembly may further include axially extending picatinny rails angularly spaced about the axial bore, the picatinny rails providing a set of teeth spaced along the axis and extending perpendicular thereto for receiving a corresponding clamping element on the reel allowing repositionable mounting of the reel at different axial locations on the picatinny rails.

It is thus a feature of at least one embodiment of the invention to provide a robust axial adjustability for the reel for positioning the handle near the user's grip The teeth of each of the picatinny rails are displaced by different radial distances from the axial bore allowing adjustment of the height of the reel through a selection of the picatinny rail to which it is mounted.

It is thus a feature of at least one embodiment of the invention to provide a height adjustment for positioning of the reel.

The fishing line reel may include includes a friction clutch positioned between the line spool and the housing for applying increasing frictional restraint to rotation of the line spool with respect to the housing with increased movement of the handle from the released position to the actuated position.

It is thus a feature of at least one embodiment of the invention to provide convenient control of line tension while the user holds the bow at its natural grip.

The frictional restraint may vary smoothly with continuous movement of the handle from the released position to the actuated position and provides substantially constant frictional restraint at each handle position.

It is thus a feature of at least one embodiment of the invention to permit precise control of tension when the user holds the bow at its natural grip point.

The fishing line reel may further include a dog clutch positioned between the line spool and the housing creating interference restraint to rotation of the line spool with respect to the housing with movement of the handle toward the actuated position after an increasing frictional restraint by the friction clutch.

It is thus a feature of at least one embodiment of the invention to allow positive locking of the fishing line at the natural grip point of the bow.

These particular objects and advantages may apply to only some embodiments falling within the claims and thus do not define the scope of the invention.

DETAILED DESCRIPTION OF THE PREFERRED EMBODIMENT

Figure 1:
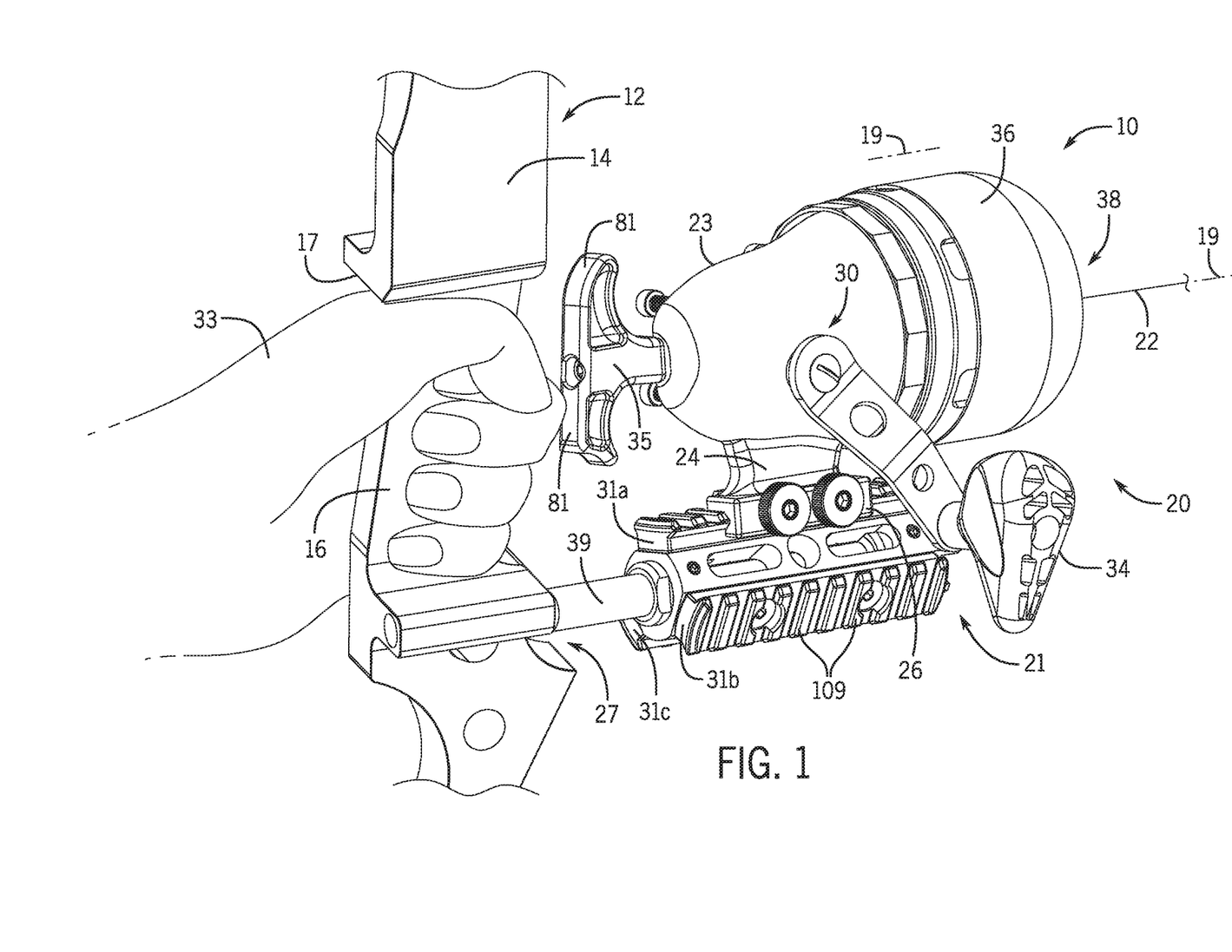
FIG. 1 is a fragmentary perspective view of a bow riser portion of a bow having the reel of the present invention attached thereto by means of an adjustable mounting system.

Referring now to FIG. 1, a bow fishing bow 10 may include a bow frame 12 presenting a bow riser 14 providing a grip 16 for gripping by the bow hand of the user 33. The bow riser 14 may provide an arrow shelf 17 above the grip 16 for supporting the arrow shaft (not shown) before release of the arrow for travel generally along axis 19.

A fishing line reel 20 for storing and paying out fishing line 22 may be attached to the bow riser 14 near the grip 16 by means of a mounting fixture 21 to be positioned generally proximate to and in front of the bow riser 14 to provide a payout axis 19' generally parallel to axis 19. The fishing line 22 used in this capacity may be, for example, a braided rather than monofilament line, for example, a braided Dacron roughly ¹⁄₃₂ inches in diameter or smaller ranging from 50 pound test to 150 pound test, that may be readily distinguished from, for example, a fly casting line by its greater strength and substantially greater outer diameter.

The fishing line reel 20 may have a reel housing 23 attached to a vertically descending mount 24 attached to lower clamp jaws 26. The clamp jaws 26 connect with a picatinny rail 31*a* of the mounting fixture 21 being one of three picatinny rails 31*a-c* available on the mounting fixture 31 as will be discussed below. The mounting fixture 21 may be attached to a mounting bushing 39 extending forward from the riser 14 below the grip 16 and attached to the riser 14 by means of a threaded bore 27 extending therethrough generally parallel to axis 19. The mounting fixture 21 will be discussed in greater detail below.

The reel housing 23 is positioned to allow the fishing line 22 extending along an axis 19' parallel to axis 19 to be proximately below but vertically aligned with axis 19. Ideally the axis 19' of the fishing line 22 is roughly centered on the grip 16 significantly limiting torque on the grip 16 when tension is applied to the fishing line 22.

A spool control handle 35 extends rearwardly from the reel housing 23 generally aligned with axis 19' and positioned close to the grip 16 so that the spool control handle 35 may be easily operated by fingers of a hand of the user 33 holding the grip 16. When not operated by the user, the control handle 35 will be in a forward released position as shown.

A single handled crank arm 30 may extend from a side of the housing 23 to be operated by the user to rotate a crankshaft (not shown in FIG. 1) to rotate the crankshaft about axis 32 perpendicular to axis 19. The crank arm 30 may include rotating grips 34 on its end as is generally understood in the art.

In normal use, a reel cone 36 may attach to the housing 23 to protect and cover an internal winding mechanism (to be discussed below) and to provide a frontward guide opening 38 restraining the exit path of the fishing line 22 along the axis 19'.

Figure 2:
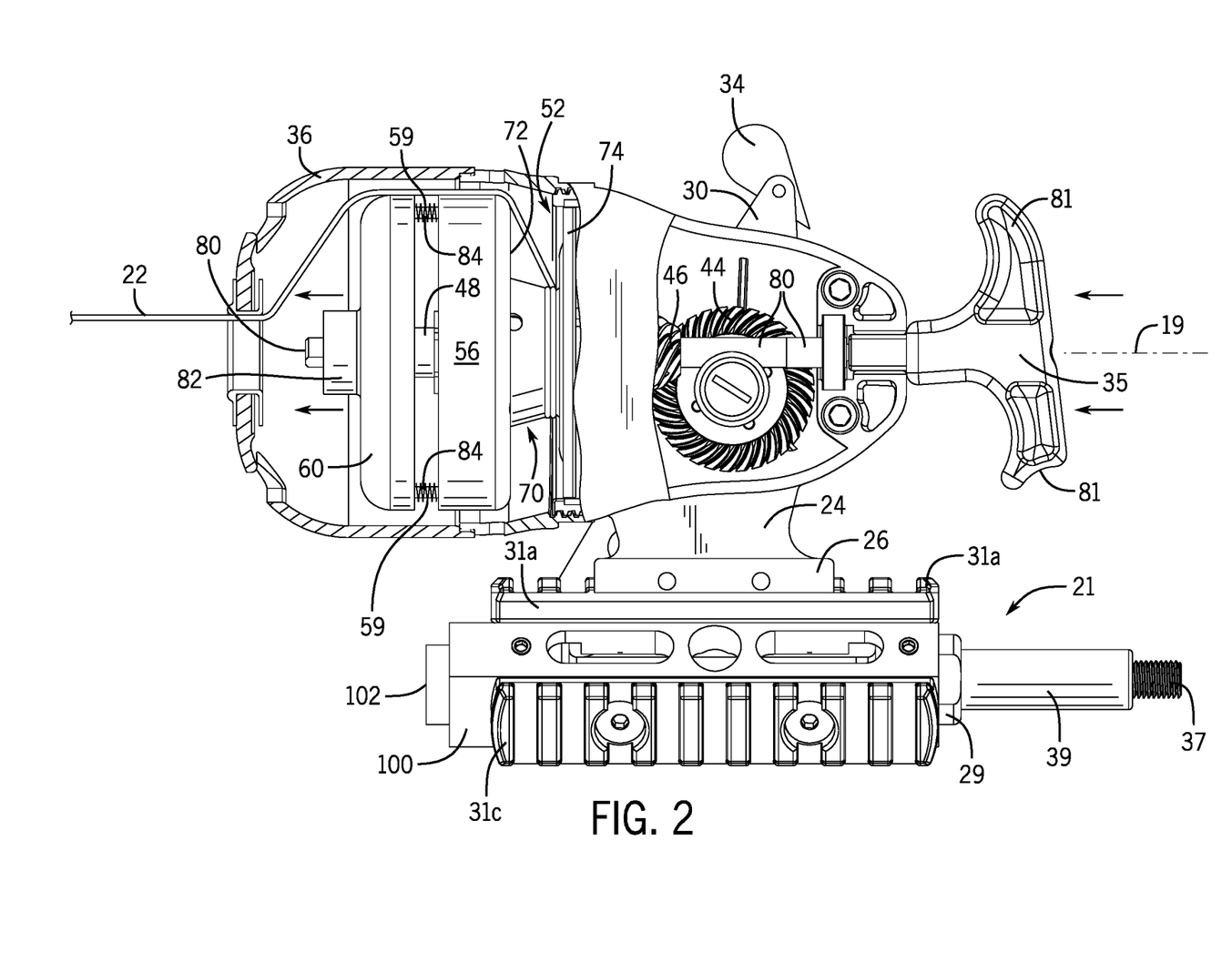
FIG. 2 is a side elevational cross-section of the reel of FIG. 1 showing positioning of the control handle forward in the released position so that the line guide used for winding line around the line spool is retracted and the line spool is free to rotate.
Figure 4:
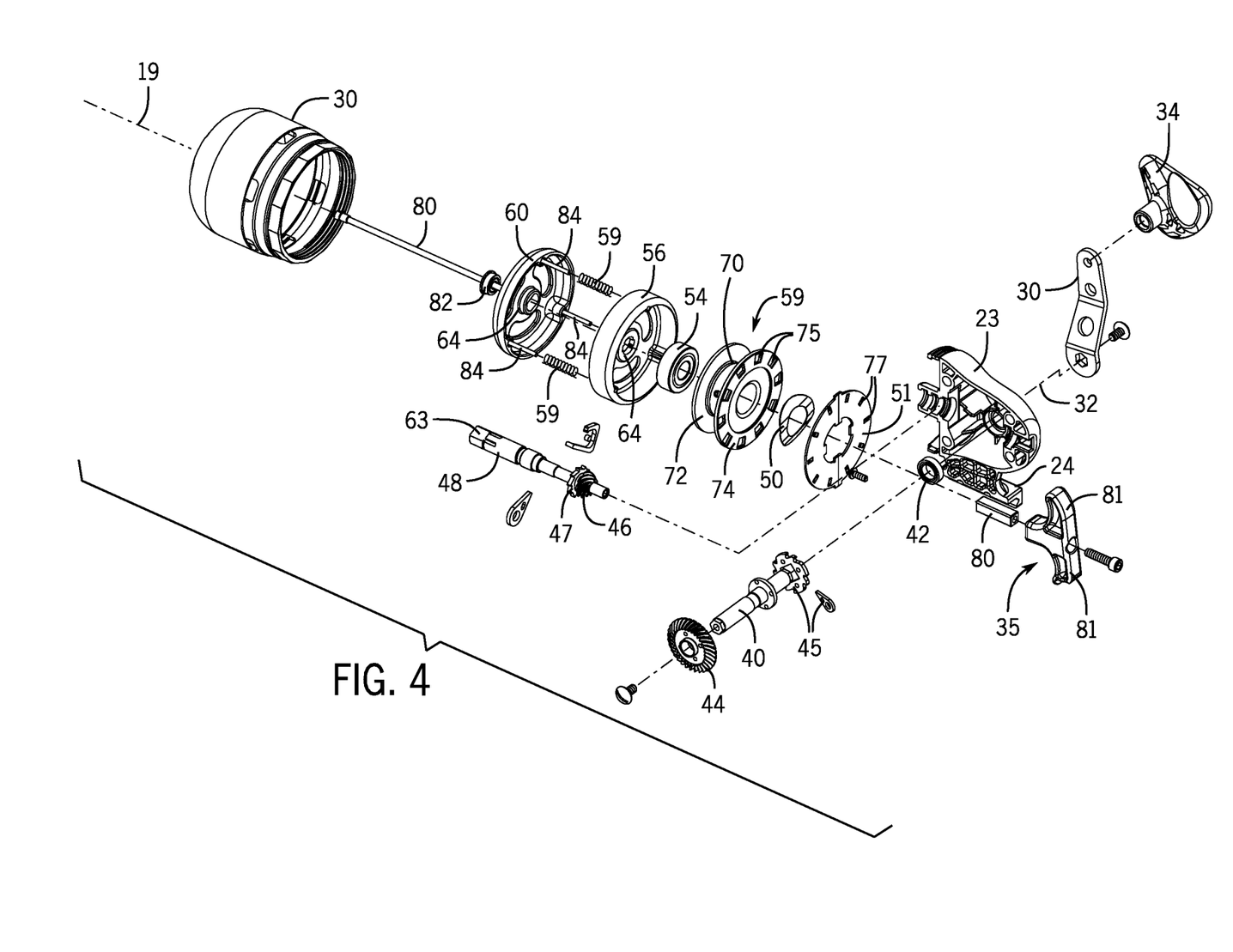
FIG. 4 is a fragmentary exploded view of the mechanism of the reel of FIG. 1 showing operation of the control handle to extend or retract the line guide within a fishing line deflector and showing positioning of a wave washer used to provide a controlled friction clutch and engagement tabs providing a dog clutch between the housing and the line spool.

Referring now to FIGS. 2 and 4, as noted above, the crank arm 30 may attach to a crankshaft 40 extending along axis 32 through a support bearing 42 held in a right side portion of the housing 23. After passing through a ratchet mechanism 45 or similar one-way clutch allowing only clockwise force to be applied to the crankshaft 40 by the crank arm 30, the crankshaft 40 may attach to bevel gear 44 The bevel gear 44 may engage with and drive a smaller pinion gear 46 attached to a transmission 48, the latter extending generally along axis 19' to rotate the transmission 48 with rotation of the crank arm 30 with a step up in rotational rate caused by the gear ratio between bevel gear 44 and smaller pinion gear 46. A second ratchet 47 may be attached to the transmission 48 to augment ratchet 45.

The transmission 48 extends forward from and out of the housing 23 to pass progressively through a tooth plate 51 having teeth 77, a wave washer spring 50, a fishing line spool 52 a bearing 54, a rear fishing line deflector 56, and a front fishing line deflector 60. A key surface 63 (or other spline-type sliding attachment) on the transmission 48 is received by corresponding key surfaces 64 on the rear and front fishing line deflectors 56 and 60 so that the rear and front fishing line deflectors 56 and 60 rotate with the transmission 48 but are free to slide within a limited range axially along axis 19' with respect to the transmission 48. Forward axial movement of the front fishing line deflector 60 on the transmission 48 is restrained.

Each of the front fishing line deflector 60 and rear fishing line deflector 56 provide substantially smooth circular outer peripheries that may allow the fishing line 22 to slide helically around axis 19' when paying off of the fishing line spool 52 as will be described below.

The fishing line spool 52 has a generally frustoconical hub 70 tapering to a larger diameter from rear to front (toward the guide opening 38) and flanked by front and rear radially-extending rims 72 and 74 which serve to retain coiled fishing line 22 on the hub 70. The front edge of the hub 70 may include a hole 76 passing generally parallel to a tangent line of the outer periphery of the hub 70 that allows the fishing line 22 to be tied positively to the hub 70 without slipping with rotation of the fishing line spool 52.

The rear rim 72 may include teeth 75 that may engage corresponding teeth 77 on a tooth plate 51 attached to the housing 23 when wave washer spring 50 is fully compressed, this compression allowing the rim 74 to move rearward as will be discussed into engagement with the tooth plate 51.

The handle 35 may attach through an opening in the rear of the housing 23 generally aligned axis 19' and may attach to a through shaft 80 that passes forward through a hollow bore extending axially through the transmission 48 along axis 19'. The through shaft 80 may thus slide smoothly through the hollow bore of the transmission 48 with movement of the handle 35 and without interference with rotation of the transmission 48. An end of the through shaft 80 extending through the transmission 48 may be attached to an end cap 82 which may press against the front surface of the front fishing line deflector 60 to provide compressive force along axis 19' without constraining the rotation of the front fishing line deflector 60 when the handle 35 is pulled back.

Three line guide pins 84 are embedded in the front fishing line deflector 60 to extend from a rear of the periphery of the front fishing line deflector 60 generally parallel to axis 19 but displaced therefrom at equal angles. The line guide pin 84 may be received within a loose, aligned bore formed in the rear fishing line deflector 56 to slide therethrough and helical compression springs 59 may fit around each line guide pin 84 between the front fishing line deflector 60 and the rear fishing line deflector 56 to bias the two apart.

The action of the wave washer spring 50 and compression springs 59 serves to move the handle 35 to the forward released position when it is not pulled back by the user. In this released position, compression springs 59 separate the rear fishing line deflector 56 from the front fishing line deflector 60 pulling the line guide pins 84 fully within the rear fishing line deflector 56 so that they may not interfere with a sliding of the fishing line 22 around the smooth, radially symmetrical outer peripheries of the line deflectors 56 and 60 during an unspooling operation. In addition wave washer spring 50 separates the teeth 77 of the rear rim 74 and teeth 75 of the tooth plate 51 attached to the housing 23 so that the line spool 52 may freely rotate. It will be understood therefore that paying out of the fishing line 22 is facilitated by the ability of the fishing line 22 to pass freely around the fishing line deflectors 56 and 60 in an unwrapping process.

Figure 3:
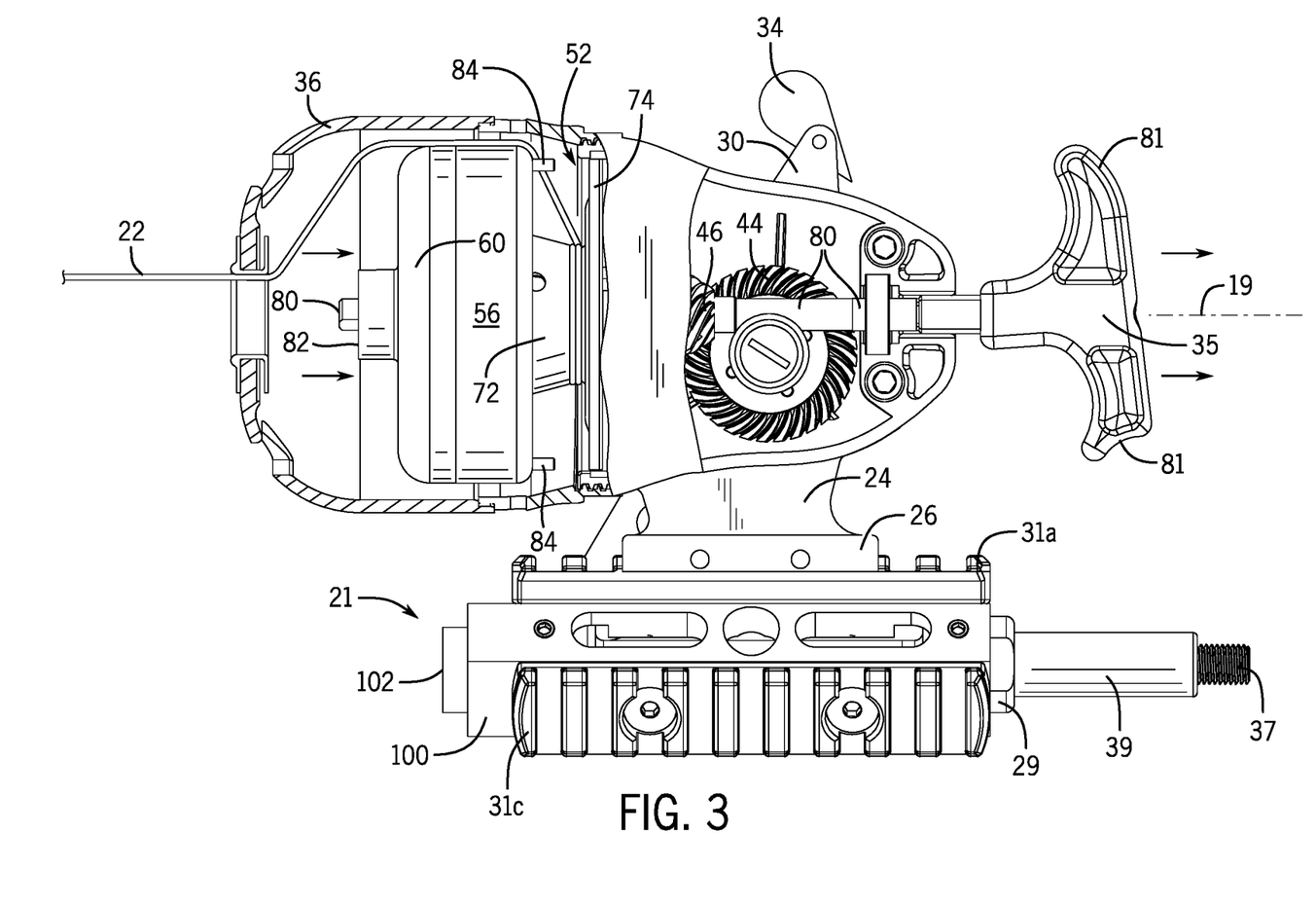
FIG. 3 is a figure similar to that of FIG. 2 showing positioning of the control handle rearward in the actuated position so that the line guide used for winding line around the line spool is extended for engaging the fishing line and the line spool is locked against rotation.

Referring now to FIGS. 3 and 4, with rearward motion of the handle 35, the through shaft 80 is pulled backward pulling end cap 82 against the front fishing line deflector 60 and pulling the rear rim 74 of the fishing line spool 52 toward the housing 23. This compression causes increased friction between the fishing line spool 52 and the housing 23 (by friction between the rear rim 74 of the wave washer 50 in the front face of tooth plate 51) with increased compression of the wave washer spring 50 such as it increases both the contact area between the wave washer spring 50 and these flanking surfaces and the force of contact. In this way the wave washer spring 50 provides part of a friction clutch.

Figure 5:
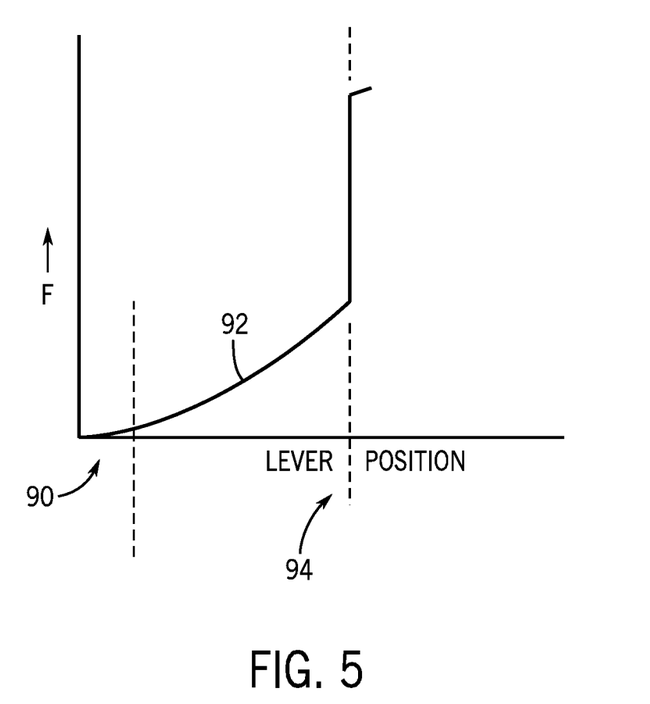
FIG. 5 is a plot of frictional force restraining the line spool against rotation as a function of the control handle positioned between a release and an actuation point.

Referring now momentarily also to FIG. 5, generally the frictional force between the line spool 52 and the housing 23 when the handle 35 is in the released position 90 shown in FIG. 2 will be substantially zero. With drawing back of the handle 35 by the user, increased force of compression on wave washer spring 50 causes a smooth increase in frictional force in region 92. When the handle 35 is fully pulled back to an actuation point 94, the teeth 75 of the rim 74 may engage teeth 77 of the tooth plate 51 to provide a dog clutch positively locking the two together and providing substantially infinite rotational resistance up to the point of breakage.

Referring still to FIGS. 3 and 4, retraction of the handle 35 rearward to the actuation position also provides an extension of the line guide pins 84 from a rear surface of the rear fishing line deflector 56 so that they may catch the fishing line 22 and, with rotation driven by the crank arm 30, wrap the fishing line 22 around the fishing line spool 52 which is now held in a locked position. It will be noted that the actual control of the tension of the fishing line 22 will be a function of restraint of the line spool 52 and prevention of rotation of the rear and front fishing line deflectors 56, the latter effected through the user control of the crank arm 30.

During use, an arrow slide on an arrow (not shown but as depicted in U.S. Pat. No. 6,517,453 hereby incorporated by reference) will be attached to a free end of the fishing line 22 and engage with the bowstring, for example, held by the user's right hand (assuming a right handed user and bow)

while the user's left hand holds the grip 16 as shown in FIG. 1. The user's fingers will be free of the handle 35 and thus when the arrow is released the fishing line 22 will be able to pay out at rapid speed. For retrieval of the arrow and fishing line 22, the user may simply extend the fingers of the hand of the user 33 holding the bow to engage the handle 35 and pull it back into a frictional or locking engagement. The user's right hand will then be able to operate the crank arm 30. By simultaneous control of the crank arm 30 and the handle 35 tensioning, retraction of the fishing line may be flexibly controlled.

Referring again to FIGS. 1 and 4, the handle 35 may be a handle providing wings 81 extending in opposite directions perpendicularly to shaft 80 to each receive one or more fingers of the user 33 on either side of the shaft 80 to provide for a centered retraction force. The surface of the wings 81 toward the reel 20 may be arcuate for improved comfort and finger centering at equal distance from the shaft 80.

Figure 6:
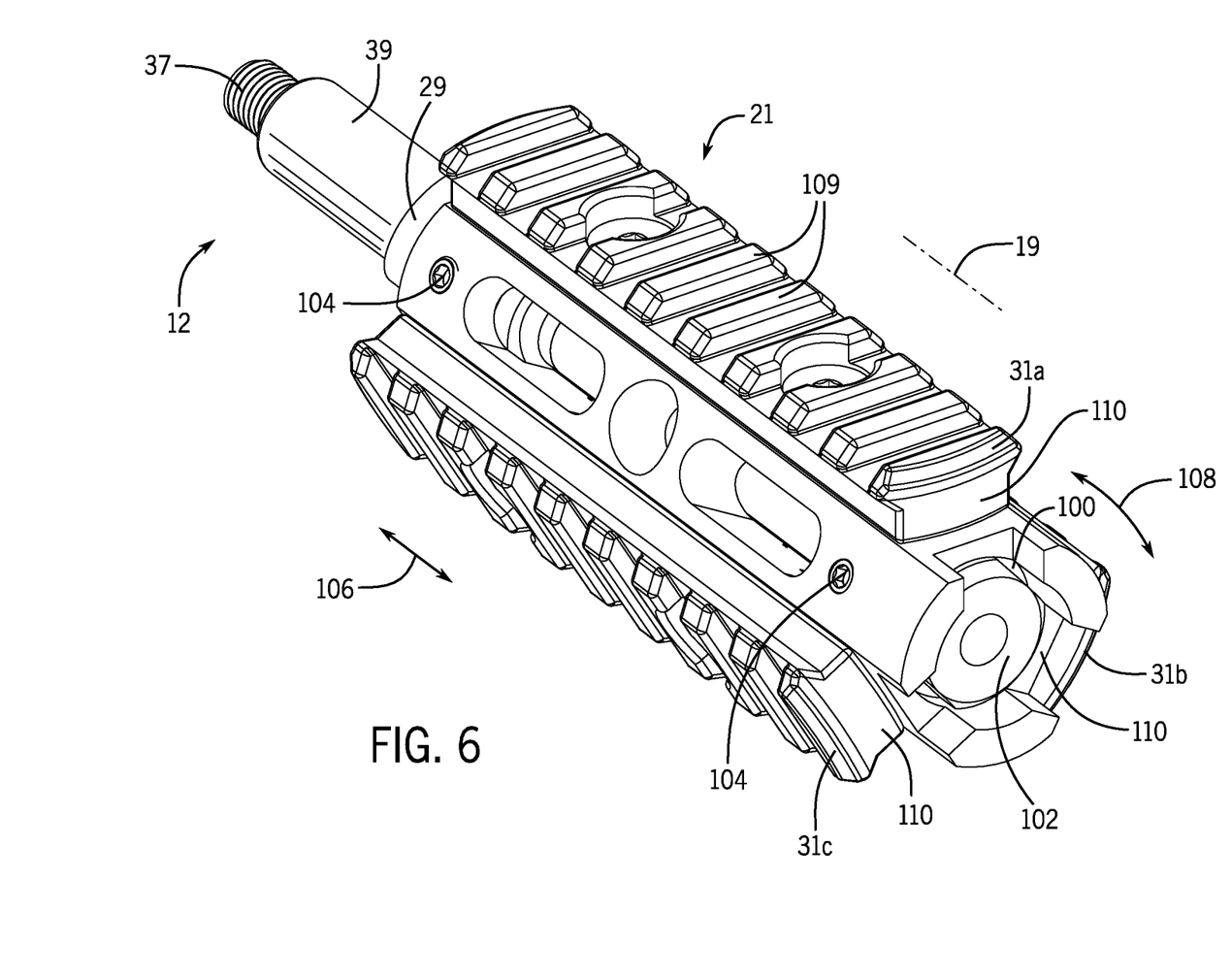
FIG. 6 is a perspective view of the adjustable mounting system of FIG. 1 showing its adjustability in extension and rotation.
Figure 7:
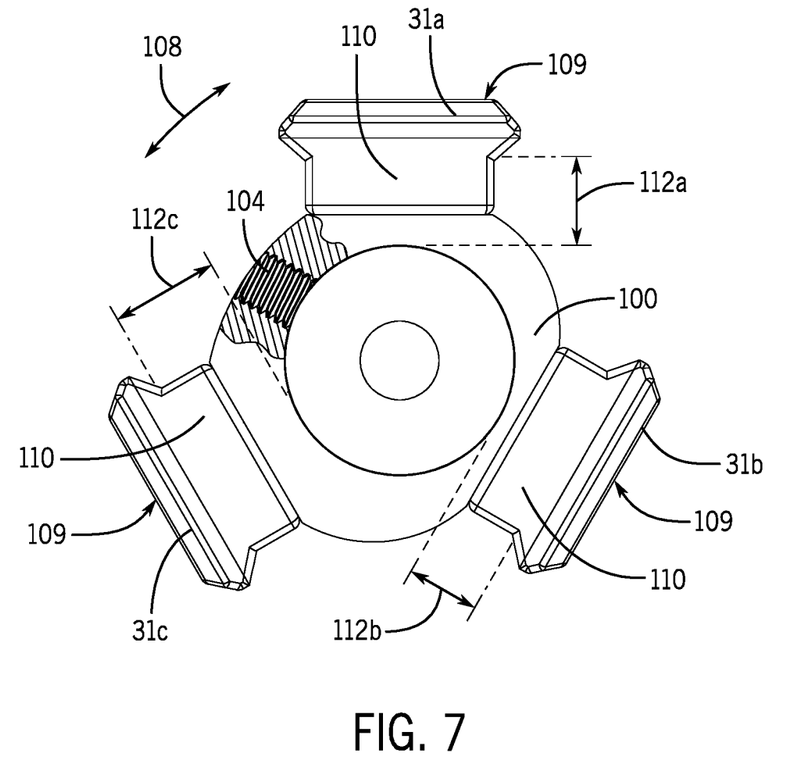
FIG. 7 is an end elevational view of the adjustable mounting system of FIG. 1 showing the provision of multiple mounting heights by means of rotation.

Referring now to FIGS. 1, 6 and 7, the mounting fixture 21 may provide for a support tube 100 having an inner diameter receiving the mounting bushing 39 to be retained on the mounting bushing 39. Axial motion 106 of the support tube 100 away from the bow is blocked by a bar head 102 being a portion of increased diameter blocking further movement of the support tube 100 away from the bow frame 12. Axial motion in the opposite direction is blocked by means of a collar 29. The mounting bushing 39 is generally circular in cross-section and includes a threaded end 37 that may be received by corresponding threads in bore 27 (shown in FIG. 1).

The support tube 100 may provide for threaded axial holes receiving set screws 104 or the like that may be loosened to allow rotational movement 108 about the axis of the mounting bushing 39. In this way the attached reel 20 (shown in FIG. 1) may be positioned rotationally so that handle 35 is aligned with the user's fingers and easily accessible while the user 33 is holding the bow frame 12.

The support tube 100 holds three picatinny rails 31a-31c each extending generally parallel to the axis 19 having teeth 109 extending perpendicularly thereto and facing radially outward with respect to an axis of the mounting bushing 39. The mount 24 provides a releasable clamp of conventional design that may receive any of the picatinny rails 31a-31c at a variety of axial locations allowing axial adjustability of the reel 20 with respect to the bow frame 12 and also allowing the handle 35 to be better aligned with the user's fingers and be easily accessible while the user 33 is holding the bow frame 12.

Each of the picatinny rails 31a-31c is supported on a standoff portion 110 at a different radial extent 112a-112c by virtue of different wall thicknesses of the support tube 100. Accordingly by rotation of the support tube 100, a different upward face may be presented to the reel 20 allowing the elevational height of the reel 20 to be adjusted over a range of approximately one-quarter inch in eighth-inch increments. These differences in extent may be provided alternatively by spacers that fit between the picatinny rails 31a-31c and a constant wall thickness support tube 100.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A mounting system for a bow providing a bow frame with a bow riser having a grip for gripping the bow by a user and a stabilizer mounting point beneath the grip, the mounting system comprising:
   a mounting bushing attachable to the bow at the stabilizer mounting point beneath the grip to extend forwardly therefrom along an extension axis; and
   a reel comprising
      a frame providing a releasable connector engaging a mounting fixture;
      a line spool rotatable with respect to the frame to pay out line forwardly along the extension axis in a first state and wind in line rearwardly along the extension axis in a second state;
      a release actuator operable by the user to move the line spool from the first state to the second state;
   wherein the releasable connector of the reel releasably engages with the mounting fixture at a range of different positions along the extension axis to permit adjustment of a separation between the release actuator and the bow grip allowing operation of the release actuator using a bow gripping hand;
   wherein the releasable connector has a vertically descending jaw receiving the mounting fixture at discrete mounting locations.

2. The mounting system of claim 1 wherein the mounting fixture provides discrete mounting locations spaced along the extension axis for receiving the reel and allowing repositionable mounting of the reel along the extension axis.

3. The mounting system of claim 2 wherein the mounting fixture provides a set of rails extending along the extension axis and angularly spaced about the extension axis at spaced apart angles to provide discrete mounting locations spaced about the extension axis for receiving the reel and allowing repositionable mounting of the reel at different axial locations.

4. The mounting system of claim 3 wherein each of the rails provide a set of teeth spaced along the extension axis and extending perpendicular to the extension axis.

5. The mounting system of claim 4 wherein the set of teeth are displaced by different radial distances from the extension axis to permit adjustment of a separation between the release actuator and the mounting fixture through a selection of the rail to which the reel is mounted.

6. The mounting system of claim 3 wherein the mounting fixture has varying wall thicknesses at the different axial locations.

7. The mounting system of claim 3 wherein a radial distance between the extension axis and the rails varies at the different axial locations.

8. The mounting system of claim 1 wherein the mounting fixture includes a rotatable sleeve repositionable about a second extension axis of a center shaft parallel with the extension axis and a set of rails are attached to the sleeve that can be releasably locked in rotation.

9. The mounting system of claim 8 wherein the rotatable sleeve is locked in position by at least one screw extending radially through the rotatable sleeve.

10. The mounting system of claim 9 wherein the center shaft includes a head retaining the rotatable sleeve against forward motion.

11. The mounting system of claim 10 wherein the center shaft includes a collar retaining the rotatable sleeve against rearward motion.

12. The mounting system of claim 1 wherein a distal end of the mounting fixture is outwardly threaded for receipt into a corresponding threaded bore of the bow at the stabilizer mounting point.

13. A mounting system for a bow providing a bow frame with a bow riser having a grip for gripping the bow by a user and a stabilizer mounting point beneath the grip, the mounting system comprising:
a mounting bushing attachable to the bow at the stabilizer mounting point beneath the grip to extend forwardly therefrom along an extension axis; and
a reel comprising
a frame providing a releasable connector engaging a mounting fixture;
a line spool rotatable with respect to the frame to pay out line forwardly along the extension axis in a first state and wind in line rearwardly along the extension axis in a second state;
a release actuator operable by the user to move the line spool from the first state to the second state;
wherein the releasable connector of the reel releasably engages with the mounting fixture at a range of different positions along the extension axis to permit adjustment of a separation between the release actuator and the bow grip allowing operation of the release actuator using a bow gripping hand;
wherein the mounting fixture provides discrete mounting locations spaced along the extension axis for receiving the reel and allowing repositionable mounting of the reel along the extension axis;
wherein the mounting fixture provides a set of rails extending along the extension axis and angularly spaced about the extension axis at spaced apart angles to provide discrete mounting locations spaced about the extension axis for receiving the reel and allowing repositionable mounting of the reel at different axial locations;
wherein each of the rails provide a set of teeth spaced along the extension axis and extending perpendicular to the extension axis;
wherein the set of teeth are displaced by different radial distances from the extension axis to permit adjustment of a separation between the release actuator and the mounting fixture through a selection of the rail to which the reel is mounted.

14. A mounting system for a bow providing a bow frame with a bow riser having a grip for gripping the bow by a user and a stabilizer mounting point beneath the grip, the mounting system comprising:
a mounting bushing attachable to the bow at the stabilizer mounting point beneath the grip to extend forwardly therefrom along an extension axis; and
a reel comprising
a frame providing a releasable connector engaging a mounting fixture;
a line spool rotatable with respect to the frame to pay out line forwardly along the extension axis in a first state and wind in line rearwardly along the extension axis in a second state;
a release actuator operable by the user to move the line spool from the first state to the second state;
wherein the releasable connector of the reel releasably engages with the mounting fixture at a range of different positions along the extension axis to permit adjustment of a separation between the release actuator and the bow grip allowing operation of the release actuator using a bow gripping hand;
wherein the mounting fixture includes a rotatable sleeve repositionable about a second extension axis of a center shaft parallel with the extension axis and a set of rails are attached to the sleeve that can be releasably locked in rotation;
wherein the rotatable sleeve is locked in position by at least one screw extending radially through the rotatable sleeve.

* * * * *